June 13, 1933.  E. ALTENKIRCH  1,913,467
ABSORPTION REFRIGERATING MACHINE
Original Filed March 18, 1929
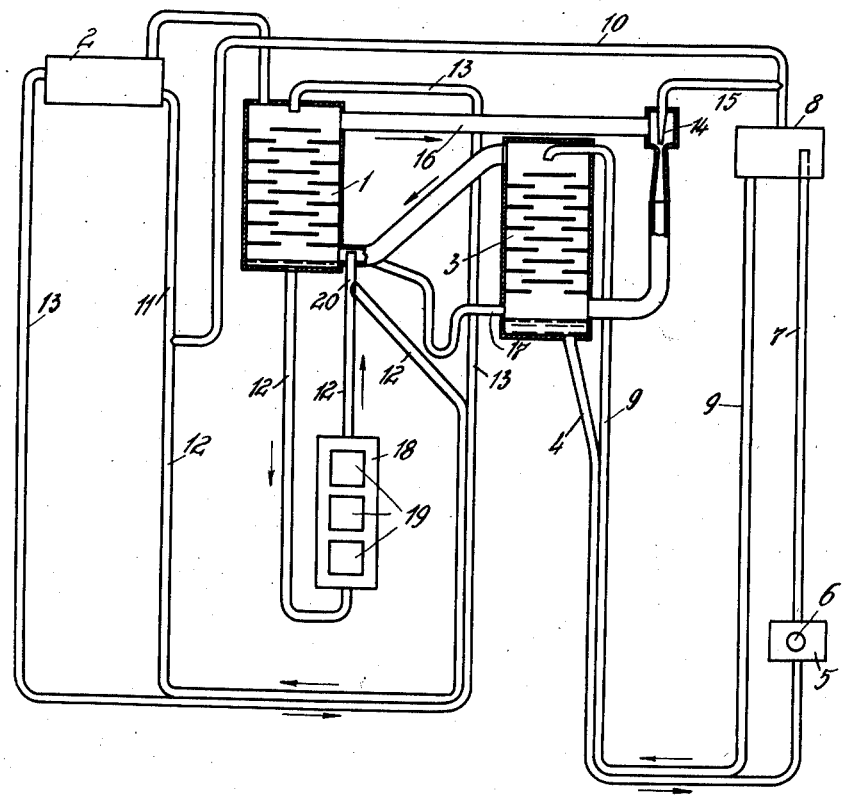

Patented June 13, 1933

1,913,467

UNITED STATES PATENT OFFICE

EDMUND ALTENKIRCH, OF NEUENHAGEN NEAR BERLIN, GERMANY, ASSIGNOR, BY MESNE ASSIGNMENTS, TO THE HOOVER COMPANY, OF NORTH CANTON, OHIO, A CORPORATION OF OHIO

ABSORPTION REFRIGERATING MACHINE

Application filed March 18, 1929, Serial No. 347,984, and in Germany March 28, 1928. Renewed December 9, 1932.

My invention relates to improvements in absorption refrigerating machines, and more specifically in continuously acting machines of this type operated exclusively by the application of heat.

Refrigerating machines intended to be used for cooling a chamber, such as a refrigerator cabinet, frequently also serve for making ice from water in suitable receptacles. In an absorption refrigerating machine in which the working medium evaporates out of an absorption solution in an evaporator, the ice making apparatus is according to my invention located in the piping through which the lean absorption solution or solution from which the gas has been evaporated escapes from the evaporator. The cold necessary for making ice is thus in this case not withdrawn directly from the evaporator, but from the lean absorption solution escaping from it.

In the drawing affixed hereto and forming part of my specification an embodiment of my invention is illustrated diagrammatically.

Referring to this drawing, 1 is an evaporator in which a gaseous working medium, such as ammonia, is evaporated out from an obsorption solution such as ammonia and water, which has been prepared in the reabsorber 2. The working medium evaporates into an inert or neutral gas (such as air), which circulates between the evaporator 1 and the absorber 3. In the absorber 3 the working medium is absorbed again from the gas mixture. The absorption solution enriched in the absorber passes through a pipe 4 into a boiler 5 adapted to be heated by an electric heating cartridge 6. Gas bubbles are there formed in the absorption solution, which entrain the solution through a thin rising pipe 7 opening into a rectifier chamber 8, into said rectifier chamber. Here the gas and the liquid are separated from each other. While the absorption salution is returned into the absorber 3 through a pipe 9, which forms a heat exchanger with the pipe 4, the expelled gas passes through a pipe 10 and an ascending pipe 11 into the reabsorber 2, where it is again absorbed. This gas serves at the same time to raise in the ascending pipe 11 the lean absorption solution discharged from the evaporator through pipe 12, to such an extent, that it is able to enter the elevated reabsorber 2. The evaporator 1 is supplied with rich absorption solution by a pipe 13 issuing from the reabsorber 2 and forming an overflow, which stands in heat exchange with the pipe 12 and opens into the evaporator at its upper end. A small portion of the gas developed in the boiler 5, is branched off pipe 10 and is discharged through a pipe 15 and a nozzle 14 into the circulating pipe 16 for the gas mixture, which includes the absorber 3 and the evaporator 1, thereby setting the gas mixture in motion in the direction of the arrows shown. From the lowest point of the gas mixture pipe 16 leading from the absorber 3 to the evaporator 1 a pipe 17 forming a liquid seal leads to the lower part of the absorber 3, and serves for returning excess quantities of liquid from the reabsorber system into the absorber system.

Pipe 12 through which the lean absorption solution escapes from the evaporator, forms a U below the evaporator 1. In the ascending limb of this U-pipe is located a receptacle 18, which is provided with ice cells 19, around which the solution passes. In these cells which are filled with water, ice is formed on account of the low temperature of the absorption solution. Above receptacle 18 pipe 12, ascending at the beginning, turns later downward, and runs in close proximity to pipe 13 to form a heat exchanger with the latter. The highest point of pipe 12 is connected with the gas mixture pipe 16 by a pipe 20 and thereby with the gas chamber of evaporator 1. By this connection pipe 12 is prevented from choking up with gas bubbles, which are liable to form due to the heating of the absorption solution on its passage through receptable 18. Pipe 20 terminates above the liquid level in the evaporator determined by the discharge pipe 17, so that the weak absorption solution must take its path through pipe 12 and vessel 18 in the direction indicated by the arrows. The ice making receptacle 18 is located so low, that its liquid space is filled with absorption solution even if the machine is not in operation. To ensure this and at the same time the necessary minimum liquid level in ascending pipe 11 when the machine is started, the point above receptacle 18, at which pipe 12 turns downward is located slightly above the point where the gas mixture pipe 10 is connected to ascending pipe 11.

The quantity of ice which can be made in the ice making receptacle depends on the temperature of the absorption solution traversing the pipe 12 and on the circulating speed of this solution. This speed may be controlled by regulating the quantity of gas supplied through pipe 10, i. e. by applying more or less heat to boiler 5. Within certain limits it is thus possible to adapt in a simple manner the quantity of the ice produced to the requirement.

A special advantage of the described apparatus resides in the fact that the ice making receptacle may be arranged below the evaporator at any desired place of the refrigerating chamber. This permits an excellent insulation of the ice making cells, so that the ice produced keeps a comparatively long time even when the machine is stopped and the refrigerating chamber gradually warms up.

Various modifications and changes may be made without departing from the spirit and the scope of the invention.

I claim as my invention:

1. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, and an ice making receptacle located in said return pipe.

2. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in one of its shanks.

3. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in the shank in which the liquid ascends.

4. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in the shank in which the liquid ascends, said ascending shank being turned downwardly a suitable distance above said receptacle.

5. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in the shank in which the liquid ascends, said ascending shank turning downwardly at a point located a suitable distance above said receptacle and a pipe connected to said shank at said turning point and leading into said evaporator for separating from the absorption solution gas developed while the solution traverses said receptacle.

6. In an absorption refrigerating machine in combination, an evaporator, an absorber, a generator, and a reabsorber, conduits operatively connecting the aforementioned units, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in the shank in which the liquid ascends, said ascending shank turning downwardly at a point located a suitable distance above said receptacle and a pipe connected to said shank at said turning point and leading into the gas space of said evaporator for separating from the absorption solution gas developed while the solution traverses said receptacle.

7. In an absorption refrigerating machine in combination, an evaporator, an absorber, a generator, and a reabsorber, conduits operatively connecting the aforementioned units, neutral gas mixture circulating pipes connecting the evaporator top with the absorber bottom, and the absorber top with the evaporator bottom respectively, a pipe connecting said reabsorber with said evaporator for supplying rich absorption solution to said evaporator, a second pipe connecting said evaporator with said reabsorber for returning lean solution from the evaporator to said reabsorber, said pipe being U-shaped and containing an ice making receptacle in the shank in which the liquid ascends, said ascending shank turning downwardly at a point located a suitable distance above said receptacle and a pipe connected to said shank at said turning point and leading into the gas mixture pipe entering near the bottom of the evaporator for separating from the absorption solution gas developed while the solution traverses said receptacle.

In testimony whereof I affix my signature.

EDMUND ALTENKIRCH.